A cover page of United States Patent 4,191,549.

United States Patent [19]
Boyko

[11] 4,191,549
[45] Mar. 4, 1980

[54] SOLAR CHEMICAL PROCESS FOR SLUDGE TREATMENT

[76] Inventor: Michael Boyko, 1308 Jasmine St., Denver, Colo. 80220

[21] Appl. No.: 935,962

[22] Filed: Aug. 22, 1978

Related U.S. Application Data

[63] Continuation of Ser. No. 766,206, Feb. 7, 1977, abandoned.

[51] Int. Cl.$^2$ .............................................. C05F 13/00
[52] U.S. Cl. ........................................... 71/13; 71/25; 8/118; 162/4; 162/6; 162/9; 162/DIG. 9; 210/66; 34/93
[58] Field of Search ............... 8/118, 119; 162/4, 6–9, 162/76, 82, 87, DIG. 9; 34/93; 203/DIG. 1; 202/234; 159/1 S, 1 SF, 1 W; 71/1, 11, 12, 13, 23, 25, 37, 40; 210/10, 18, 42, 62, 66, 67, 152

[56] References Cited

U.S. PATENT DOCUMENTS

| | | | |
|---|---|---|---|
| 99,248 | 1/1870 | Sheldon | 8/119 |
| 137,452 | 4/1873 | Karcheski | 8/119 |
| 1,482,939 | 2/1924 | McIntosh | 8/119 |
| 2,279,848 | 4/1942 | Unger, Jr. | 34/93 X |
| 3,342,731 | 9/1967 | Baumann | 210/10 X |
| 3,361,186 | 1/1968 | Wildi et al. | 203/DIG. 1 |
| 3,561,598 | 10/1969 | Goldberg | 210/10 |
| 3,932,166 | 1/1976 | Vignovich | 71/37 X |
| 4,028,130 | 6/1977 | Webster et al. | 210/66 X |

OTHER PUBLICATIONS

Modern Pulp and Paper Making, Witham, 1942, pp. 70–71.

*Primary Examiner*—Charles N. Hart
*Assistant Examiner*—Ferris H. Lander
*Attorney, Agent, or Firm*—Kyle W. Rost

[57] ABSTRACT

A solar chemical process for converting sewer sludge from a gelatinous mass into a manageable product suitable for fertilizer includes the manufacture of a carbonaceous product by treating cellulose waste such as newspaper with sulfuric acid and heating the mixture until the cellulose product becomes substantially black. The black product is mixed with sludge in a ratio to produce a grainy product that can be chlorinated for sterility and spread as fertilizer. In a modified version of the process, coal ash is added to the sludge with the carbonaceous product for its nutrient value, and sand may be added with the coal ash to aid in aeration of the soil.

18 Claims, No Drawings

SOLAR CHEMICAL PROCESS FOR SLUDGE TREATMENT

This is a continuation of application Ser. No. 766,206, filed Feb. 7, 1977, and now abandoned.

BACKGROUND OF THE INVENTION

1. Field of the Invention

The invention relates to liquid purification and separation, and also to fertilizer chemistry. More specifically, the invention involves the conversion of activated sludge into a manageable material suited for use as fertilizer, or the conversion of organic brewery waste into cattle feed. The process of the invention also produces a carbonaceous material that can be adapted for use as insulation, soil conditioner, or carbon black.

2. Description of the Prior Art

Modern sewage treatment involves the aeration of sewage in the presence of aerobic bacteria, which convert the sewage into a gelatinous mass known as activated sludge. The sludge settles in large tanks and eventually is drawn off in a form that contains about 99% water. Various treatments are applied at this point to further dehydrate the sludge, including the addition of sulfuric acid and heat to cause evolution of gas, which raises the solids from the liquid and reduces the water content of the sludge to about 85%. This process is described in U.S. Pat. No. 1,025,622 to Grossmann, U.S. Pat. No. 1,325,787 to Grossman, and U.S. Pat. No. 1,430,182 to Peck.

Chemical and mechanical means for dehydrating sludge are known to include the addition of flocculants to the sludge and the use of mechanical vacuum drums to physically draw some of the liquor from the sludge. The dehydration achieved by these means reduces the volume of solid mass but does not alter the gelatinous nature of the remaining sludge. Even when the sludge has been substantially dehydrated, it remains unmanageable because of the physical characteristics of the end product.

Attempts to eliminate the sludge disposal problem are reflected in U.S. Pat. No. 3,922,221 to Rosler and U.S. Pat. No. 3,948,774 to Lindman. Each of these patents requires a specialized plant structure in order to chemically and physically process the sludge into water and a solid residue. The high cost of installing and maintaining such systems makes use practical only in specialized situations where sewage storage is not possible.

Sludge burning, known as Pyrolysis, was thought to be an ideal solution to the problem of sludge disposal.

The sludge problem has worsened to crisis proportions since 1972, when Congress passed legislation requiring municipalities to upgrade sewage treatment facilities as an aid to reducing water pollution. With the help of federal funds, sewage treatment plants have improved their ability to extract sludge from sewage through secondary treatment. One expert has estimated that the elevation of a sewage treatment plant facilities from primary to secondary treatment can mean from fifty to one thousand percent increase in the facility's sludge output. Accordingly, the disposal problem has grown as the quantity of sewage treatment has increased. Current estimates are that the United States produces three hundred million tons of wet sludge per year, with the Environmental Protection Agency estimating that sludge disposal costs may be in excess of one billion dollars annually. The problem and the costs are expected to substantially increase in 1977, which is the deadline for fully secondary treatment of sewage by all communities.

Sludge disposal is limited in that the sludge can be placed only in the air, in the sea, or on land. Air disposal, by burning, was thought to be an ideal solution and a burning process known as pyrolysis was developed to produce charcoal as a by-product. However, after the oil embargo of 1973, burning became overly expensive and the problem of air pollution further added to the demise of the burning process.

Disposal in the sea has long been the practice in coastal areas, but in recent years both federal and state concern for this practice has increased. The federal government has ordered both New York and Philadelphia to phase out their dumping in the Atlantic, and California has ordered the City and County of Los Angeles to stop disposal in the Pacific. The problems of ocean dumping are that marine life is subjected to unknown hazards and, at least on the Atlantic coast, the sludge has returned to beaches and presented severe pollution problems.

Disposal on land is the presently preferred approach, but problems exist because of nature and composition of the sludge. Activated sludge is composed primarily of human waste and contains bacteria and viruses that can be harmful to humans and animals. In addition, some sludges contain heavy metals discharged by industry. Thus, it is important that sludge does not enter drinking water supplies or contaminate crops. One of the unsolved problems of disposal on land is that the sludge is an unmanageable gelatenous material that is difficult to penetrate with conventional sterilizing agents. When the gel is dumped as land fill, it retains water for exceptionally long periods of time, produces offensive odor, and is a breeding ground for harmful bacteria and viruses that can enter ground waters through rain water run-off.

Sludge is known to contain beneficial nutrient for plant growth and could be used as a fertilizer as long as heavy metal release is controlled. The main problems in this use are that sludge is difficult to transport in gelatenous form and may not be evenly spread as conventional dry fertilizers. The odor of sludge fertilizers is also a severe problem, and this problem is also complicated by the gelatenous nature of the sludge, which resists treatment by deodorizing agents.

A method of treating organic garbage that may include sewage and that produces a compost-like material is disclosed in U.S. Pat. No. 3,758,287 to Scheel. This patent suggests combining highly concentrated sulfuric acid with magnesium oxide and organic waste and allowing the mixture to exothermically react, the resulting product being a sterile compost. This process creates a problem in the soil because of the presence of magnesium sulfate, $Mg\ SO_4$, in the compost. Magnesium salts of strong acids tend to make the soil overly acidic because, by cation exchange, absorbed hydrogen is replaced by metallic cations of the salt, liberating a strong acid in the soil, for example $H_2SO_4$. Therefore, salts such as $MgSO_4$ and $MgCl_2$ are seldom used in lime materials, which more common agricultural limes may include magnesium salts of weak acids, such as carbonates, or basic compounds such as oxides and hydroxides, which leave no objectionable residue in the soil.

The terms "sludge" and "sewer sludge" as used hereafter shall refer to sludges that have been dehydrated to a gelatinous state, either through known means as have been described above or through means yet to be devised.

SUMMARY OF THE INVENTION

A solar-chemical process uses recycled cellulose and sulfuric acid to create a treated cellulose product having carbonaceous characteristics. The carbonaceous product is mixed with sewage sludge, producing a grainy solid product that may be transported through pipes or chutes, and is suited for use in conventional fertilizer spreading equipment.

The carbonaceous product may be produced from shredded newspapers, grass clippings, farm wastes, or a variety of cellulose waste materials. The cellulose is mixed with a 6 to 8% solution of sulfuric acid and exposed to sunlight or to an alternative source of heat. Within five hours of sunlight exposure, the material has become quite dry and is from light to dark brown in color. At this stage, the cellulose contains organic sugars and may be mixed with non-sludge materials such as brewery wastes to produce a cattle feed. However, if the material remains in the sun for six to eight hours, it becomes completely dry and black. In the black stage, it may be mixed with sewage sludge to alter the gelatenous nature of the sludge and produce a grainy material that is odor free and easy to handle.

An object of the invention is to convert sludge into a manageable product that does not have an objectionable odor and can be used as fertilizer with conventional spreading equipment.

Another object is to convert sludge into a material that can be sterilized by conventional chlorination. The conversion of sludge from a gelatenous mass into a grainy substance increases the surface area of the mass and allows chlorine to reach all portions of the mass.

Another object is to kill bacteria and viruses in sludge in the single process of converting the sludge into manageable material. The carbonaceous material added to the sludge is formed by an acid treatment, and the pH of this material may be adjusted by extracting controlled amounts of the acid. Ordinarily, sludge is alkaline, for example pH 9, and the addition of acidic materials can lower pH rapidly and cause pH shock, killing bacteria and virus. A further advantage of treating the sludge with a material of adjustable pH is that soil pH can also be influenced, according to local conditions and needs.

An important object of the invention is to recycle the sludge, the carbonaceous material, and the chemicals used to produce the carbonaceous material. The weak acid solution that converts cellulose such as newspaper into the carbonaceous material is extracted and reused many times. As the acid reacts with the paper, it forms additional organic acids that enter the process of converting the paper to carbonaceous material. Some of these acids have value as fertilizer and may be left in the carbonaceous material.

Another important object is to create a process that uses no external fuel energy. The cellulose is converted into carbonaceous material through the action of actinic rays of the sun. In bad weather, external fuel energy may substitute for the sun.

DESCRIPTION OF THE PREFERRED EMBODIMENT

The solar-chemical process uses acid is weak concentrations to treat cellulose waste products with heat supplied by the sun or by an alternate heat source. The cellulose waste product is converted to any of a variety of materials, which include cattle feed, a treatment product for sewer sludge, a treatment product for brewery and sugar plant wastes, fertilizer, and soil conditioner. The manufacture of these products consumes the cellulose waste material, but the acid is continuously recycled, making the process extremely economical both in the quantity of new raw material required and in the conversion of waste material into useful products.

The starting cellulose waste material may be waste paper, sawdust, lumber debris, wood, weeds, grass clippings, farm products, farm wastes, or the like. The single preferred source of cellulose is newspaper, which has proven to be widely available as a recycled product. In addition, newspaper is already in sheets and therefore requires little additional processing to assure that the acid contacts substantially all available surface area. Thus, any source of pulp paper may be used, but uncoated paper is the most convenient starting material.

The cellulose material is first soaked in an acid solution, with the single preferred acid being sulfuric because of its ready availability and low cost. Sulfuric acid is a by-product in many manufacturing processes and often presents a disposal problem in itself. For example, battery electrolyte is often disposed of in the sewer system, but could be usefully employed in the present process. The acid is added preferably in a dilute solution, as the process itself causes the acid to become concentrated.

The acid soaked cellulose material is then subjected to heat, preferably in the form of direct sunlight. The material should be arranged to avoud self-shading, with the thickness of the treated layer and the frequency of turning to be empirically determined by visual inspection. As the material is heated in sunlight, the material darkens, and in the case of newspaper, turns to yellow and then to brown. The sun's actinic rays are captured by the yellow and brown material and, the yellow and brown coloration converts additional portions of the sunlight into actinic rays, which, in the presence of the acid, break bonds in the cellulose chain structure. Within three to five hours of sunlight exposure, the material is in the color range from light to dark brown, but if exposed from six to eight hours the material becomes black.

During the darkening stages, the acid solution is becoming more concentrated through evaporation of water. At the same time, chemical action increases and the process creates organic acids in the cellulose, which acids contribute to the chemical activity and will eventually be recycled with the original acid. When the cellulose product reaches the desired stage of darkness, the process is terminated by extracting the acids, for example, by water extraction. Experiments have shown that the extracted acid solution is often stronger than the acid originally applied, and even when the water of extraction is removing substantially no further acid from the cellulose, the total volume of extracted water plus acid requires further dilution to restore the liquid to the dilute concentration of the original acid solution.

Some acid is exhausted in the process and some is lost in the cellulose, requiring that the acid solution be recharged periodically with some fresh acid, the number of acid uses between recharging being empirically determined by testing a small sample of cellulose under concentrated heat, as under a heat lamp.

After the cellulose material has reached the desired stage of darkness and the acid has been washed, the cellulose is dried, for example by further exposure to sunlight, which is now quite rapid due to the darkened color of the cellulose. The dried material may be used to treat sewer sludge or to form any of a number of other products.

EXAMPLE 1

A quantity of pulp newspaper is soaked in a 6 to 8 percent solution by volume of sulfuric acid in water using 2.2 ml. of acid per gram of newspaper. The sheet structure of the newspaper aids in distributing the acid due to capillary action between sheets. The acid-paper mixture may be wet ground to assure good acid penetration and allow uniform exposure of the mixture to sunlight. The mixture is exposed to direct sunlight for a period from six to eight hours, during which the newspsper turns progressively darker until black and becomes dry. The acid is removed by water extraction, after which the black product is again solar dried, this time much more rapidly due to the black coloration. The black dry product is then mixed with sludge in a weight ratio of sludge to black product of from 1:1 to 1:3. The mixture becomes granulated and the sludge odor ceases. The mixture is chlorinated by any known conventional means and spread as fertilizer in conventional spreading equipment.

The water extracted acid is returned to the original supply of sulfuric acid solution and the solution is adjusted to restore original acid strength.

An analysis of the extracted acid discloses the following content of sugar and volatile acids:
sugar—2.10% by weight
Acetic acid—0.23% by weight
Propionic acid—0.10% by weight
Butyric acid—0.11% by weight

EXAMPLE 2

An initial cellulose material of grass leaves, weeds and farm wastes is treated with a special acid solution for non-solar drying. The special acid solution is prepared from a six to eight percent solution of sulfuric acid by adding a highly conductive salt, preferably sufficient KCl to make 2 to 3% strength KCl. The cellulose and acid solution is wet ground and deposited in a mass for drying. A stationary electrode is placed at one end of the mass and a moveable electrode is placed in the mass nearby, creating a near short circuit for rapid starting. Current of 110 volts A.C. at 15–20 amperes is passed between the electrodes and the moveable electrode is moved to the end of the mass opposite the stationary electrode as the mass warms. The temperature of the mass is recorded at several times:

| Time | Temperature (degrees F.) |
| --- | --- |
| Start (0) | 74 |
| 5 min. | 149 |
| 10 min. | 181 |
| 10 min. plus | 220 (steam) |

Current flow continues until the mass is black and dry. As the mass dries, arcing occurs at the electrodes, but water spray directed at the arc controls the arcing. The acids are then water extracted as in example 1 and the material dried by repeated electrical treatment or by any other means. The resulting carbonaceous material is used in sludge treatment as in example 1, and the extracted acid similarly recycled.

EXAMPLE 3

A starting cellulose material of clay-coated glossy paper is first dry ground and soaked in water to separate the clay coating from the cellulose fibers, and then soaked in an approximately 12% solution of sulfuric acid. The soaked cellulose is solar dried as in example 1 or artificially dried as in example 2, the acids water extracted and recycled, and the black carbonaceous material redryed by either solar or artificial heat. The carbonaceous material is added to sludge as in the prior examples.

In the examples, the acid strength and quantity used to saturate the cellulose are not critical, but are preferred minimum quantities and strengths, chosen for acid economy and minimum evaporation times. Higher concentrations of acid would lead to more rapid destruction of the starting cellulose material and probably lead to formation of colloids, and loss of some organic materials. Increased volume of acid would lead to longer evaporation times and a need for more solar or alternate energy. Decreased concentration of acid prolongs the process as in the case of increased volumes, and when concentration is substantially below 6%, will lead to inability of the cellulose to reach the black stage. When the acid is extracted for recycling, the volume recovered by repeated water washing and has lower pH than the original preferred concentration of acid, meaning that the process does not require an acid evaporation pool to restore the concentration of acid. Rather, a proper pH below 3, as on a 6–8% sulfuric acid solution, by simply adding additional water to the recycled extract.

The heat causing evaporation of water from the cellulose and acid mixture need not be solar or electrical, as disclosed in the examples. Solar heat is preferred since it costs nothing and takes maximum advantage of the color change that occurs during the cellulose treatment. Photolysis takes place to break bonds in the cellulose structure. Photosensitivity also plays a role in oxidation, especially with respect to yellow and brown light wave lengths. Yellow and brown colors predominate in the darkening of pulp newspaper as the sun heats the paper and acid solution to temperatures in excess of 140 degrees F. Thus, the solar process is extremely efficient as it converts the cellulose to a black carbonaceous material through the interaction of actinic rays on the darkening cellulose, rising temperature also caused by the darkening color of the material, increased acid strength as water is evaporated from the material, and photo destruction of cellulose bonds.

When the electrical method of drying of example 2 is used, the potassium from the added KCl or other potassium salt is beneficial as a plant neutrient in fertilizer. The KCl otherwise aids the electrical conductivity of the solution and cellulose. Other acceptable drying methods include a rotating hot kiln or forced dry air. A combination of drying methods could be used either in combination or in series, depending on the economy desired and available sources of heat.

The ratio and composition of the carbonaceous material added to the sludge may vary according to the characteristics of the specific sludge and the intended end use of the treated sludge. The carbonaceous material may be added without acid extraction if the pH of the sludge is to be lowered, or fully neutralized carbonaceous material may be added if it is desired to increase the volume of the treated sludge product without altering pH.

Lime is usually added to sludge to keep its pH greater than 7, as overly acidic sludge tends to produce odors. Dry acidic carbonaceous material could be added to lower pH below 3 and kill bacteria and virus by pH shock, which occurs when pH changes by more than 2. When the sludge has been treated with the carbonaceous material, it may be further dried due to the loss of its former gelatenous state, further assuring destruction of bacteria. In addition, further drying raises the temperature of the sludge and encourages heat sterilization. Even though acidic conditions encourage odor, the treated acidic sludge has little or no odor.

Large quantities of neutral pH carbonaceous material may be added to sludge containing heavy metals, as the metals concentration will be decreased by solid dilution. Likewise, neutralized material may be added to raise the pH of sludge that has been subjected to pH shock. If sludge with a high pH is to be used as fertilizer, it may be mandatory that some pH modification be undertaken, as seeds refuse to grow in highly alkaline conditions. Thus, neutral and acidic carbonaceous material may be used singularly or in combination to condition sludge as a suitable addition to the soil.

Another advantage of the carbonaceous material is that it both absorbs and adsorbs anions and cations, making the ions available slowly to crops. For example, the sulfate ion is kept in colloidal structure, avoiding excess acidity in the soil when the carbonaceous material is added.

The dark color of the carbonaceous material offers the added advantage of lengthening the growing season in some areas of the country by causing the ground to reach proper temperatures for planting and growth earlier in the season, due to solar warming.

In a modified version of the carbonaceous material, fly ash or coal ash and slate may be added to provide potassium to the soil. These substances contain from 2% to 6% potassium that is readily available to the soil by allowing excess acid to remain in the carbonaceous material, which acid will extract the potassium and neutralize the natural alkalinity of coal ash and the carbonates from the slate. Inorganic colloids will be formed from the interaction of the acid with the ash and slate. Sugar acids, humic acids, and other organic acids formed in the manufacture of the carbonaceous material actively assist in the neutralization of alkalinity and extraction of potassium.

Fly ash is well known as a by-product of power generation by burning finely ground coal. Its content of potassium and other trace elements is well known, but fly ash, like sludge, has been unmanageable as a soil addition because of its tendency to become paste-like when wet, cutting air from the soil. The ratio of fly ash used is not critical, but a representative mixture by weight is one part carbonaceous material, two parts fly ash, two parts sewer sludge, and two parts sand for aeration. Such a mixture has a pH of approximately 6 or 7. pH may be adjusted to suit particular soil and sludge compositions by adjusting the quantity of acid extracted from the carbonaceous material.

I claim:

1. A process for converting dewatered gelatinous sewage sludge from a gelatinous material into a granular manageable material adapted for use as fertilizer, comprising:

(a) combining fibrous cellulose waste material with dilute acid solution,
(b) heating the combined acid and cellulose for an empirically determined time during which the acid and cellulose react, turning the cellulose into a dry substantially black carbonaceous product,
(c) mixing said dry black product with gelatinous sewage sludge in an empirically determined ratio, converting the sludge and black product mixture into a granular manageable material.

2. The process of claim 1, wherein said cellulose material is selected from the group consisting of pulp newspaper, grass and leaves.

3. The process of claim 1, wherein said dilute acid is sulfuric acid.

4. The process of claim 3, wherein said sulfuric acid is a dilute solution of from approximately 6 to 8% by volume.

5. The process of claim 3, wherein said dilute acid is added to the cellulose material in a volume of approximately 2.2 ml. acid per gram of cellulose.

6. The process of claim 1, wherein said acid and cellulose is heated by direct solar exposure, the actinic rays of the sun contributing to the chemical degradation of the cellulose molecules and the darkening color of the cellulose contributing to rising temperature and increased reaction rate.

7. The process of claim 1, wherein said dry black product is mixed with said sewage sludge in a ratio by total weight of from 1:1 to 3:1, respectively.

8. The process of claim 1, further comprising after step (a), wet grinding the combined cellulose and acid for even mixing and uniform exposure to heat.

9. The process of claim 1, further comprising after step (b), washing said black material to extract remaining acid for recycle, and redrying the black material.

10. The process of claim 1, further comprising after step (c), chlorinating the granular material for sterility to prepare the material for use as fertilizer, the chlorine penetrating the granular mass for thorough treatment.

11. The process of claim 1, wherein the cellulose starting material is clay-coated paper wherein the clay is first removed and the dilute acid is sulfuric acid at approximately twelve percent concentration.

12. The process of claim 11, further comprising dry grinding the cellulose material prior to combining the cellulose material with the acid solution for increasing the surface area of the coated material for increased reaction rate.

13. The process of claim 1, further comprising in step (c) mixing coal ash with said black product and sewage sludge to add the fertilizer value of the contents of the ash to the resulting granular manageable material.

14. The process of claim 13, further comprising adding sand to the mixture of coal ash, black product, and sewage sludge to aid in aeration of the soil into which the resultant mixture is added.

15. The process of claim 14, wherein the ratio by weight of carbonaceous material to coal ash to sludge to sand is approximately 1:2:2:2.

16. The process of claim 13, wherein said coal ash is fly ash.

17. A process for converting cellulose into a carbonaceous material, comprising:

(a) combining fibrous cellulose waste material with a dilute sulfuric acid solution of from approximately 6 to 8% by volume; and (b) heating the combined acid and cellulose by exposure to actinic solar rays for an empirically determined time during which the acid, actinic rays, and cellulose react, turning the cellulose into a product at least brown in color.

18. The process of claim 17, wherein said combined acid and cellulose are exposed to heat for an additional time sufficient to convert the cellulose into a dry, carbonaceous black product.

* * * * *